United States Patent
Fujita

(10) Patent No.: US 11,338,601 B2
(45) Date of Patent: May 24, 2022

(54) RECORDING CONDITION DETERMINING METHOD AND RECORDING DEVICE

(71) Applicant: SEIKO EPSON CORPORATION, Tokyo (JP)

(72) Inventor: Toru Fujita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/002,863

(22) Filed: Aug. 26, 2020

(65) Prior Publication Data
US 2021/0060990 A1    Mar. 4, 2021

(30) Foreign Application Priority Data

Aug. 28, 2019 (JP) .............................. JP2019-155539

(51) Int. Cl.
*B41J 29/393* (2006.01)
*B41J 2/21* (2006.01)

(52) U.S. Cl.
CPC ........... *B41J 29/393* (2013.01); *B41J 2/2146* (2013.01); *B41J 2029/3935* (2013.01)

(58) Field of Classification Search
CPC ...... B41J 29/393; B41J 19/145; B41J 2/2132; B41J 2/2135; B41J 29/38; B41J 2/04505; B41J 2029/3935; B41J 2/2146; B41J 2202/21; B41J 2/21
See application file for complete search history.

(56) References Cited

U.S. PATENT DOCUMENTS

| | | |
|---|---|---|
| 5,984,454 A | 11/1999 | Takahashi et al. |
| 2002/0063873 A1 | 5/2002 | Kakutani et al. |
| 2007/0121130 A1 | 5/2007 | Yoshida |
| 2008/0079765 A1 | 4/2008 | Takamiya et al. |

FOREIGN PATENT DOCUMENTS

| | | |
|---|---|---|
| JP | H05-318773 A | 12/1993 |
| JP | 2013-144415 A | 7/2013 |
| WO | 2005/042256 A1 | 5/2005 |

*Primary Examiner* — Jannelle M Lebron
(74) *Attorney, Agent, or Firm* — Global IP Counselors, LLP

(57) ABSTRACT

A recording condition determining method executed by a recording device performing recording by a main scanning, in which while moving a recording head in a main scanning direction, dots are ejected from nozzles onto a recording medium, and a sub scanning, in which the recording medium is transported in a sub scanning direction. The method includes a patch recording step, the patch recording step being performed by recording patches at a plurality of different positions in the sub scanning direction by a plurality of types of overlap-processing under respectively different recording conditions, in a single recording job performed by the recording device. The method further includes a selection accepting step, and a determination step of determining, as a recording condition of the overlap-processing of an actual recording, the recording condition of the overlap processing corresponding to the patch selected in the selection accepting step.

8 Claims, 8 Drawing Sheets

RECORDING CONDITION DETERMINING METHOD AND RECORDING DEVICE

The present application is based on, and claims priority from JP Application Serial Number 2019-155539, filed Aug. 28, 2019, the disclosure of which is hereby incorporated by reference herein in its entirety.

BACKGROUND

1. Technical Field

The present disclosure relates to a recording condition determining method by a recording device, and a recording device.

2. Related Art

An inkjet printer is known that forms an image on a recording medium by ejecting a liquid onto the recording medium. Further, an inkjet printer has been disclosed that has a configuration in which bands, which are images formed onto a recording medium by moving a head in a movement direction intersecting a transport direction of the recording medium, are partially overlapped with each other at a boundary between the bands (see JP-A-2013-144415). The process of recording the bands so that the bands are partially overlapped with each other is also referred to as overlap-processing. By performing the overlap-processing, it is possible to prevent a white stripe from being formed at the boundary along the movement direction of the head.

When there is a difference in image quality, such as in density, on the recording medium between a region recorded by the overlap-processing and a region recorded without applying the overlap-processing, the difference in the image quality between those regions is visually recognized as an unevenness in the density, a misalignment of patterns, and the like within the recording image. Thus, it is necessary to employ the overlap-processing appropriate for making such a difference in the image quality unnoticeable. However, it is not easy for a user to select recording conditions for the appropriate overlap-processing that suppresses the difference in the image quality.

SUMMARY

A recording condition determining method is executed by a recording device performing recording onto a recording medium by a main scanning in which, while moving a recording head that is provided with the plurality of nozzles in a main scanning direction, dots of a liquid are ejected from the plurality of nozzles onto the recording medium, and a sub scanning in which the recording medium is transported in a sub scanning direction intersecting the main scanning direction. The method includes a patch recording step of recording patches onto the recording medium by overlap-processing in which a the main scanning is performed on a partial region of the recording medium a plurality of times in an overlapping manner, the patch recording step being performed by recording patches at a plurality of different positions in the sub scanning direction by a plurality of types of the overlap-processing under respectively different recording conditions, in a single recording job performed by the recording device. The method further includes a selection accepting step of accepting selection of a patch from among a plurality of the recorded patches, and a determination step of determining, as a recording condition of the overlap-processing of an actual recording, the recording condition of the overlap-processing corresponding to the patch selected in the selection accepting step.

DESCRIPTION OF EXEMPLARY EMBODIMENTS

An exemplary embodiment of the present disclosure will be described below with reference to the accompanying drawings. Each of the drawings is merely illustrative for describing the exemplary embodiment. Since each of the drawings is illustrative, ratios may not be accurate or aligned with each other, or some portions may be omitted.

1. General Description of Device

Figure 1:
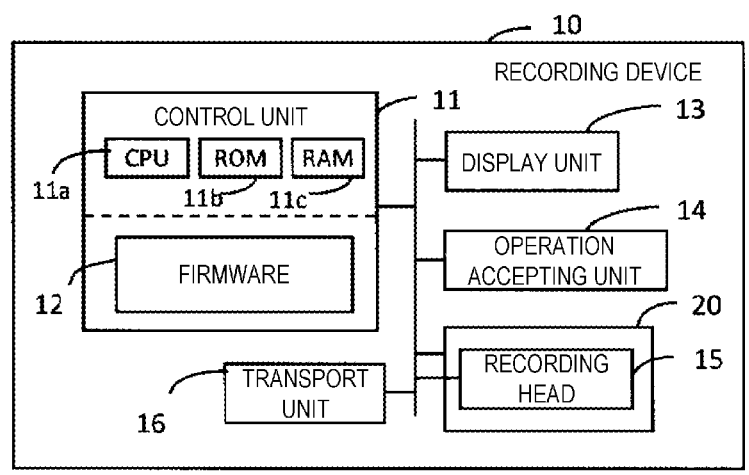
FIG. 1 is a block diagram illustrating a device configuration in a simplified manner.

FIG. 1 illustrates a configuration of a recording device 10 according to the present exemplary embodiment in a simplified manner. The recording device 10 may be described as a liquid ejecting device, a printing apparatus, a printer, or the like. The recording device 10 performs a "recording condition determining method". The recording device 10 is provided with a control unit 11, a display unit 13, an operation accepting unit 14, a recording head 15, a transport unit 16, a carriage 20, and the like. The control unit 11 is configured to include one or a plurality of ICs, another non-volatile memory, and the like. The IC includes a CPU 11*a* as a processor, a ROM 11*b*, a RAM 11*c*, and the like.

In the control unit 11, the processor, namely, the CPU 11*a*, executes arithmetic processing according to a program stored in the ROM 11*b*, the other memory, or the like, while using the RAM 11*c* or the like as a working area, in order to control each unit of the recording device 10. For example, the control unit 11 executes processing according to firmware 12, which is a type of the program. Note that the processor is not limited to the single CPU, and may be configured to perform the processing using a plurality of the CPUs or a hardware circuit, such as an application specific integrated circuit (ASIC), or may be configured to perform the processing using the CPU in conjunction with the hardware circuit.

The display unit 13 is a unit for displaying visual information, and is configured, for example, by a liquid crystal display, an organic EL display, or the like. The display unit 13 may be configured to include a display and a drive circuit for driving the display. The operation accepting unit 14 is a unit for accepting an operation by a user, and is realized by, for example, a physical button, a touch panel, a keyboard, a mouse, or the like. Of course, the touch panel may be realized as a function of the display unit 13. The display unit 13 and the operation accepting unit 14 can be referred to as an operating panel of the recording device 10. Further, the display unit 13 or the operation accepting unit 14 may be a part of the recording device 10, or may be an external peripheral device coupled to the recording device 10.

The transport unit 16 is a mechanism for transporting the recording medium. As is known, the transport unit 16 includes a roller for transporting the recording medium from upstream to downstream in a transport direction, a motor for rotating the roller, and the like. As the recording medium, a paper sheet, fabric, or other material is used. The recording device 10 that uses the fabric as the recording medium can be referred to as a textile printer.

Figure 2:
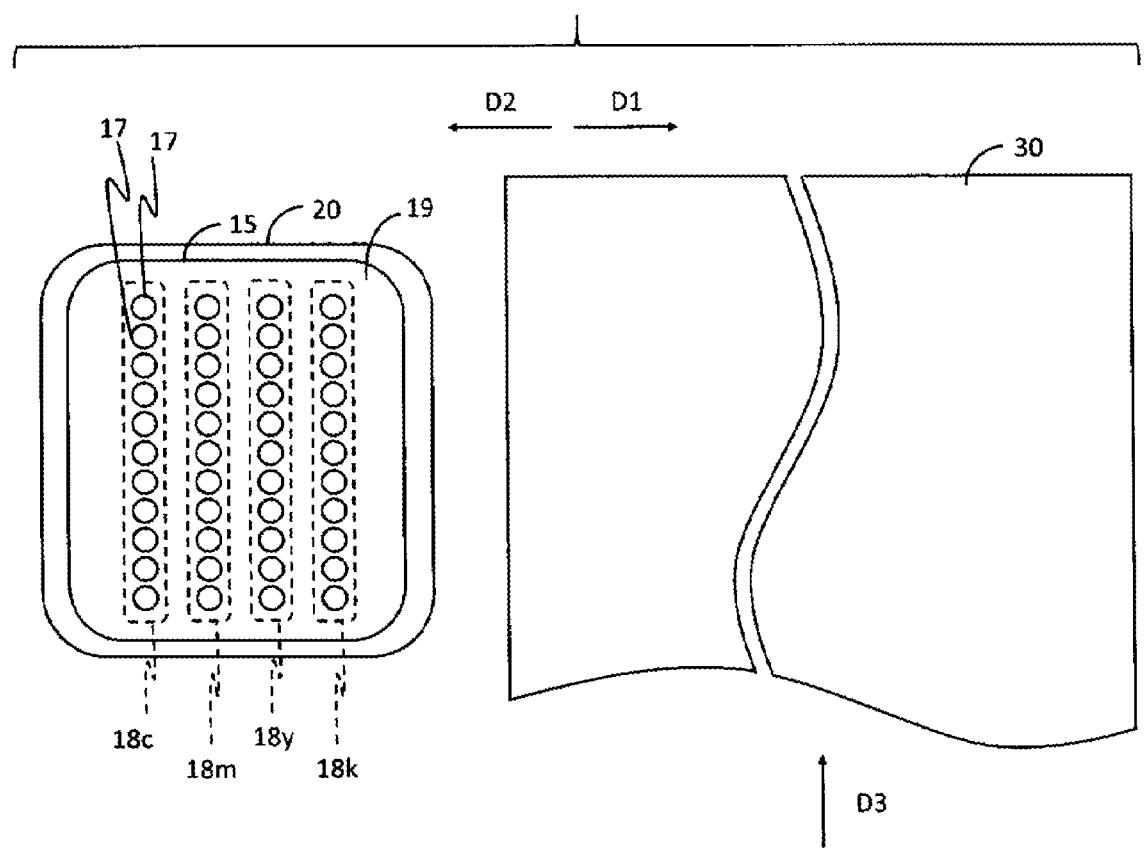
FIG. 2 is a diagram illustrating a relationship between a recording head including nozzle rows and a recording medium.

The recording head 15 ejects a liquid using an inkjet method to perform recording. As illustrated in FIG. 2, the recording head 15 includes a plurality of nozzles 17 capable of ejecting the liquid, and ejects the liquid onto a recording medium 30 transported by the transport unit 16 from each of the nozzles 17. The liquid refers to a liquid in general that can be used for the recording on the recording medium 30. The liquid will be referred to as ink below. Droplets of the ink ejected by the nozzles 17 will be referred to as dots. Note that, in the following description, the expression "dots" will be used as appropriate, even when describing image processing performed by the control unit 11 before the dots are ejected by the nozzles 17. By controlling application of a drive voltage to a drive element (not illustrated) provided in each of the nozzles 17 in accordance with dot data defining dot-on and dot-off, the control unit 11 causes the nozzles 17 to eject or stop ejecting the dots.

FIG. 2 illustrates the recording head 15 including a plurality of nozzle rows. In addition, FIG. 2 illustrates a relationship between the recording head 15 and the recording medium 30 in a simplified manner. The recording head 15 may be described as a liquid ejecting head, a printing head, a print head, or the like. The recording head 15 is mounted on the carriage 20 that is movable in a predetermined direction D1 and a direction D2, which is the opposite direction to the direction D1, and moves together with the carriage 20. In other words, the control unit 11 moves the recording head 15 in the direction D1 and the direction D2 by controlling driving of a carriage motor that provides power for the carriage 20 to move. In FIG. 1 and FIG. 2, the illustration is simplified while assuming that the carriage motor is also a part of the carriage 20.

One of the directions D1 and D2 may be referred to as a positive direction, a forward direction, or the like of main scanning, and the other of the directions D1 and D2 may be referred to as a negative direction, a return direction, or the like of the main scanning. The directions D1 and D2 are also collectively referred to as a main scanning direction. The transport unit 16 transports the recording medium 30 in a direction D3 intersecting the directions D1 and D2. The direction D3 is also referred to as a sub scanning direction, or the transport direction. Although the above-mentioned "intersecting" means being orthogonal, it does not only mean being strictly orthogonal, and the meaning of "intersecting" may also include a degree of error that occurs due to mounting accuracy of actual parts, and the like.

A reference numeral 19 denotes a nozzle surface 19 in which the nozzles 17 of the recording head 15 are open. FIG. 2 illustrates an arrangement example of the plurality of nozzle rows in the nozzle surface 19. In a configuration in which the ink of each color is supplied from a liquid holding unit (not illustrated), which is referred to as an ink cartridge, an ink tank, or the like installed in the recording device 10, the recording head 15 is provided with the nozzle row for each of the ink colors. The nozzle row is configured by the plurality of nozzles 17 that have a constant nozzle pitch, which is an interval between the nozzles 17 along the direction D3, and that eject the same color ink. The recording head 15 ejects the ink of a plurality of colors such as cyan (C), magenta (M), yellow (Y), and black (K).

In an example illustrated in FIG. 2, the recording head 15 is provided with a nozzle row 18c configured by the plurality of nozzles 17 that eject ink C, a nozzle row 18m configured by the plurality of nozzles 17 that eject ink M, a nozzle row 18y configured by the plurality of nozzles 17 that eject ink Y, and a nozzle row 18k configured by the plurality of nozzles 17 that eject ink K. Further, in the recording head 15, the plurality of nozzle rows 18c, 18m, 18y, and 18k are aligned along the directions D1 and D2, and are disposed at the same position in the direction D3. In the example illustrated in FIG. 2, although a longitudinal direction of each of the plurality of nozzle rows 18c, 18m, 18y, and 18k is parallel to the direction D3, the longitudinal direction of the nozzle rows may be inclined with respect to the direction D3. The longitudinal direction of the nozzle rows is also referred to as a nozzle row direction. The number of nozzle rows provided in the recording head 15 for each of the ink colors need not necessarily be one, as illustrated in FIG. 2, and two or more of the nozzle rows may be provided for one color. The color of the ink ejected by the recording head 15 is not limited to CMYK.

The recording device 10 realizes the recording on the recording medium 30 by alternately repeating the "main scanning" in which the dots are ejected onto the recording medium 30 from the nozzles 17 while moving the recording head 15 in the main scanning direction, and a "sub scanning" in which the recording medium 30 is transported in the sub scanning direction intersecting the main scanning direction. The main scanning is also referred to as a pass.

The configuration described above may be realized not only by a single independent device, but may also be realized by an information processing device and a printer that are communicably coupled to each other. Examples of the information processing device include a personal computer, a smartphone, a tablet terminal, a mobile phone, a server, or a device having a similar level of processing capability as those devices mentioned above. In other words, the recording device 10 may be realized by the information processing device, which serves as a recording control device including the control unit 11 and the like, and a printer including the recording head 15, the carriage 20, the transport unit 16, and the like.

2. Test Recording

Figure 3:
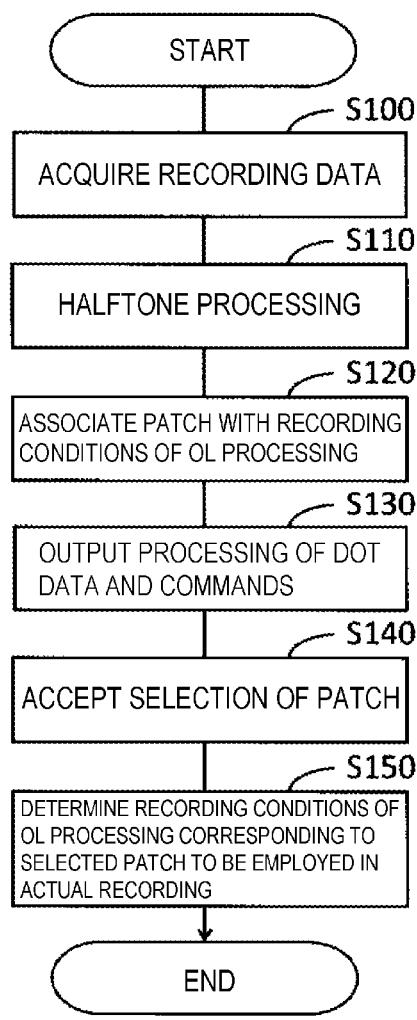
FIG. 3 is a flowchart illustrating a method for determining recording conditions.

FIG. 3 illustrates, using a flowchart, a record condition determining method, which is performed by the control unit 11 in accordance with the firmware 12. Processing illustrated in the flowchart of FIG. 3 is started when the user instructs the recording device 10 to perform one-time "test recording" via the operation accepting unit 14. In the flowchart of FIG. 3, the processing from steps S100 to S130 corresponds to the one-time test recording. The one-time test recording corresponds to a single recording job performed by the recording device 10. The recording job may be referred to as a print job. The test recording is recording processing that is performed prior to "actual recording", which is another recording job that causes a recording image arbitrarily specified by the user to be recorded on the recording medium 30 as an image to be recorded. The test recording is recording processing required to determine optimum overlap-processing to be employed in the actual recording. The overlap-processing is processing in which the main scanning is performed a plurality of times in an overlapping manner on a partial region of the recording medium 30. Hereinafter, overlap will be abbreviated as "OL".

At step S100, the control unit 11 acquires recording data, which is image data representing a test image used in the test recording. The recording data is, for example, RGB data in a bitmap format in which each pixel has a gradation value for each of RGB (red, green, and blue). Alternatively, the recording data is CMYK data in a bitmap format in which each pixel has a gradation value for each of CMYK. The gradation values are expressed, for example, using 256 gradations, namely, using values from 0 to 255. The recording data is stored in advance in a storage medium, such as a memory provided inside or outside the recording device 10 so as to be accessible by the recording device 10, and the control unit 11 acquires the recording data from a storage destination of the recording data.

The test image is, for example, a pattern image specially prepared for the test recording, which is prepared in advance as an image suitable for evaluating a plurality of patches to be recorded by a plurality of types of the OL processing having respectively different recording conditions.

Alternatively, the test image may be the recording image that is represented by the recording data specified for the actual recording. In the following description, it is assumed that the recording data for the actual recording has been specified as the test image prior to step S100, by an operation of the operation accepting unit 14 by the user. Then, at step S100, the control unit 11 acquires the recording data specified for the actual recording as the recording data for the test recording.

At step S110, the control unit 11 performs halftone processing on the recording data. Specific techniques for the halftone processing are not particularly limited, and a dither method, an error diffusion method, or the like may be employed, for example. By the halftone processing, the gradation values for each of the CMYK included in each of the pixels of the recording data are converted into information defining ejection of the dots (dot-on) or non-ejection of the dots (dot off) for each of the ink colors that can be ejected by the recording head 15. The recording data on which the halftone processing has been performed is referred to as dot data. If the recording data acquired at step S100 is data, such as RGB data, using a different color system or format from the CMYK data, the control unit 11 may perform color conversion processing or format conversion processing to the recording data as necessary to convert the data into the CMYK data, and then perform the halftone processing on the data.

As described above, the dot data is data defining the dot-on or dot-off for each of the pixels and for each of the ink colors. However, the dot data may be data defining the dot-off, or the dot-on in one of sizes among a plurality of dot sizes. Each of the nozzles 17 is capable of ejecting three types of the dots having relatively different sizes per droplet, for example. Of these three types of the dots, dots with the smallest size are referred to as small dots, dots one size up from the small dots are referred to as medium dots, and dots with the largest size are referred to as large dots. In such a situation, the dot data may be data defining one of dot-off, small dot-on, medium dot-on, or large dot-on for each of the pixels and for each of the ink colors.

At step S120, the control unit 11 associates a plurality of "patches" in the test image with the recording conditions of the OL processing. The patch is a part of an image region configuring the test image, and is an image region recorded by the OL processing. However, for convenience, a recorded result of the patch in the recording medium 30 will also be referred to as the patch in the following description.

Figure 4:
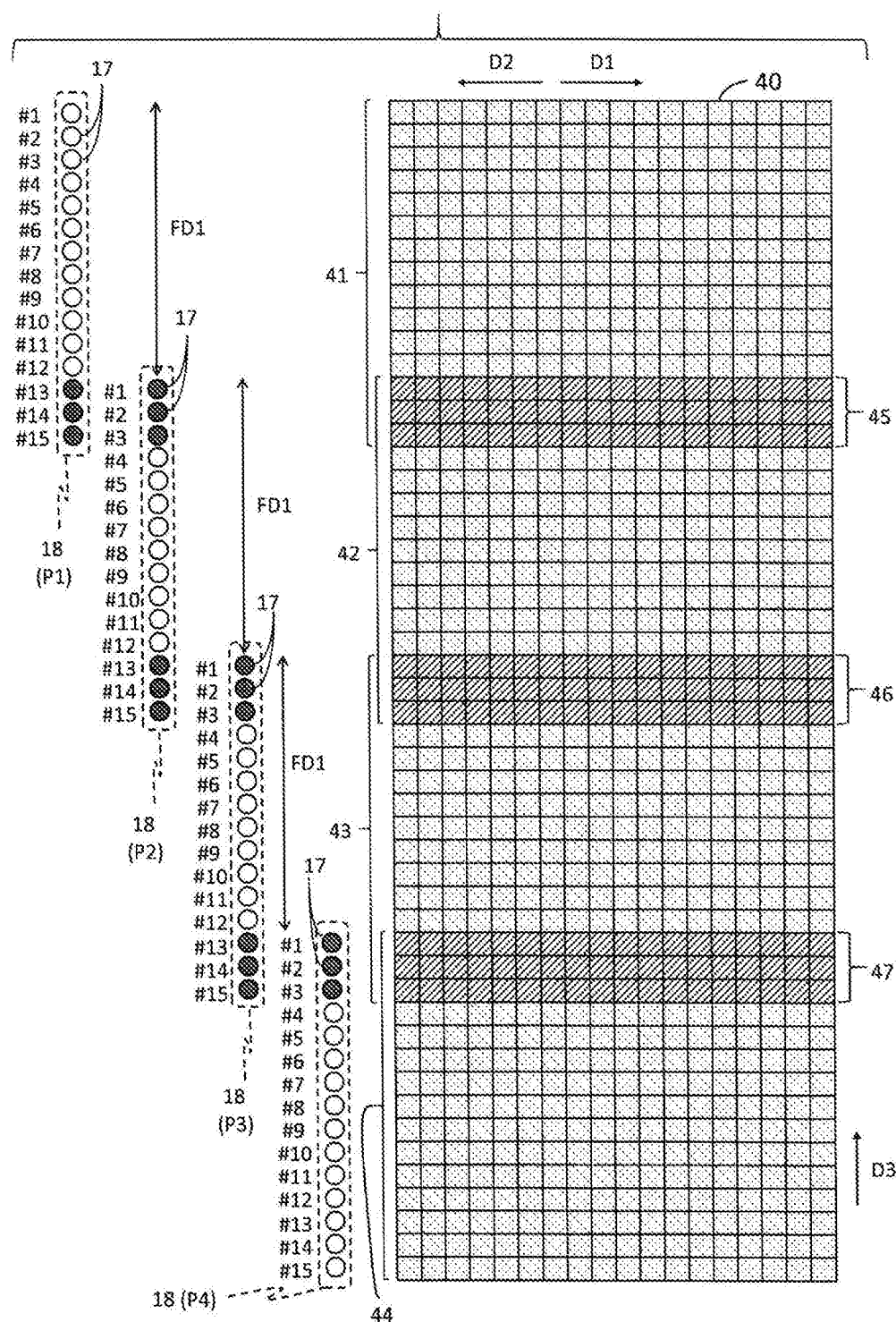
FIG. 4 is an explanatory diagram illustrating recording processing including standard OL processing.

FIG. 4 is an explanatory diagram illustrating recording processing including the OL processing performed by the recording device 10. A reference numeral 40 denotes the recording data acquired at step S100. Each of individual rectangles configuring the recording data 40 represents each of the pixels. In FIG. 4, correspondence relationships between the recording data 40 and the directions D1, D2, and D3 are also illustrated. The OL processing, which will be described with reference to FIG. 4, is referred to as standard OL processing for convenience.

In FIG. 4, by illustrating one of the nozzle rows 18 to the left of the recording data 40, correspondence relationships between each of the pixels configuring the recording data 40 and each of the nozzles 17 configuring the nozzle row 18 are also illustrated. The nozzle row 18 may be understood to be any one of the nozzle rows 18c, 18m, 18y, and 18k, or to collectively represent the nozzle rows 18c, 18m, 18y, and 18k. In FIG. 4, for ease of description, nozzle numbers #1, #2, #3 . . . #15 are sequentially assigned to each of the nozzles 17 configuring the nozzle row 18 from downstream to upstream in the transport direction D3. Of course, the number 15 of nozzles 17 configuring the nozzle row 18 is merely an example.

A reference sign P1, which is indicated in parentheses along with the reference numeral "18" of the nozzle row 18, denotes a first main scanning P1 performed for recording the recording data 40. Similarly, a reference sign P2 denotes a second main scanning P2 performed for recording the recording data 40, a reference sign P3 denotes a third main scanning P3 performed for recording the recording data 40, and a reference sign P4 denotes a fourth main scanning P4 performed for recording the recording data 40. In other words, by illustrating the nozzle row 18 at a plurality of locations while shifting the nozzle row 18 along the transport direction D3, FIG. 4 illustrates a state in which the main scanning is performed a plurality of times to record the recording data 40.

Of course, the recording head 15 including the nozzle row 18 does not actually move upstream in the transport direction D3, but by the transport unit 16 transporting the recording medium 30 downstream in the transport direction D3 by a predetermined distance during an interval between the main scanning and the next main scanning, relative positional relationships between the nozzle row 18 and the recording data 40 during each of the main scannings P1, P2, P3, and P4 illustrated in FIG. 4 are realized. According to an example illustrated in FIG. 4, each of the main scannings P1, P2, P3, and P4 is shifted from one another along the transport direction D3 by a distance that is 12 times the nozzle pitch. In other words, in the example illustrated in FIG. 4, the recording medium 30 is transported by the single sub scanning between the main scanning and the next main scanning by the distance that is 12 times the nozzle pitch. The distance that is 12 times the nozzle pitch according to the example illustrated in FIG. 4 is referred to as a standard transport distance and is denoted by a reference sign FD1. According to such a sub scanning, a part of the region of the recording medium 30 recorded by the three nozzles 17 having the nozzle numbers #13 to #15 in the main scanning P1 is recorded by the three nozzles 17 having the nozzle numbers #1 to #3 in the main scanning P2. Similarly, a part of the region of the recording medium 30 recorded by the nozzles 17 having the nozzle numbers #13 to #15 in the main scanning P2 is recorded by the nozzles 17 having the nozzle numbers #1 to #3 in the main scanning P3, and a part of the region of the recording medium 30 recorded by the nozzles 17 having the nozzle numbers #13 to #15 in the main scanning P3 is recorded by the nozzles 17 having the nozzle numbers #1 to #3 in the main scanning P4.

A region of the recording data 40 recorded by the main scanning P1 is referred to as a first band 41. Similarly, of the recording data 40, a region recorded by the main scanning P2 is referred to as a second band 42, a region recorded by the main scanning P3 is referred to as a third band 43, and a region recorded by the main scanning P4 is referred to as a fourth band 44. Then, a region in which two of the bands overlap with each other is an OL region recorded by the OL processing. In the present exemplary embodiment, such an OL region is referred to as the "patch". For convenience, of the recording data 40, a region in which the first band 41 and the second band 42 overlap with each other is referred to as a first patch 45, a region in which the second band 42 and the third band 43 overlap with each other is referred to as a second patch 46, and a region in which the third band 43 and the fourth band 44 overlap with each other is referred to as a third patch 47. As can be understood from FIG. 4, in the standard OL processing, the first patch 45 is an image recorded by each of the nozzles 17 having the nozzle numbers #13 to #15 in the main scanning P1 and each of the nozzles 17 having the nozzle numbers #1 to #3 in the main scanning P2. Similarly, the second patch 46 is an image recorded by each of the nozzles 17 having the nozzle numbers #13 to #15 in the main scanning P2 and each of the nozzles 17 having the nozzle numbers #1 to #3 in the main scanning P3, and the third patch 47 is an image recorded by each of the nozzles 17 having the nozzle numbers #13 to #15 in the main scanning P3 and each of the nozzles 17 having the nozzle numbers #1 to #3 in the main scanning P4.

Of each of the bands recorded by each of the main scannings, a region to which the OL processing is not applied is referred to as a non-OL region. In FIG. 4, for ease of understanding the distinction between the regions, the non-OL regions of the recording data 40 are decorated with fine black spots, and each of the patches is decorated with diagonal lines. These decorations are not included in the content of the test image represented by the recording data 40.

The nozzles 17 used for the OL processing, such as each of the nozzles 17 having the nozzle numbers #1 to #3 and the nozzle numbers #13 to #15, are referred to as "OL nozzles". In addition, a range in which the OL nozzles are continuously provided in the transport direction D3 in the nozzle row 18 is referred to as an "OL nozzle range". Of course, the configuration in which the three nozzles 17 respectively arranged on both end portions of the nozzle row 18 in the transport direction D3 are used as the OL nozzles is merely an example. Each of the nozzles 17 that does not correspond to the OL nozzle is referred to as a "non-OL nozzle".

Figure 5:
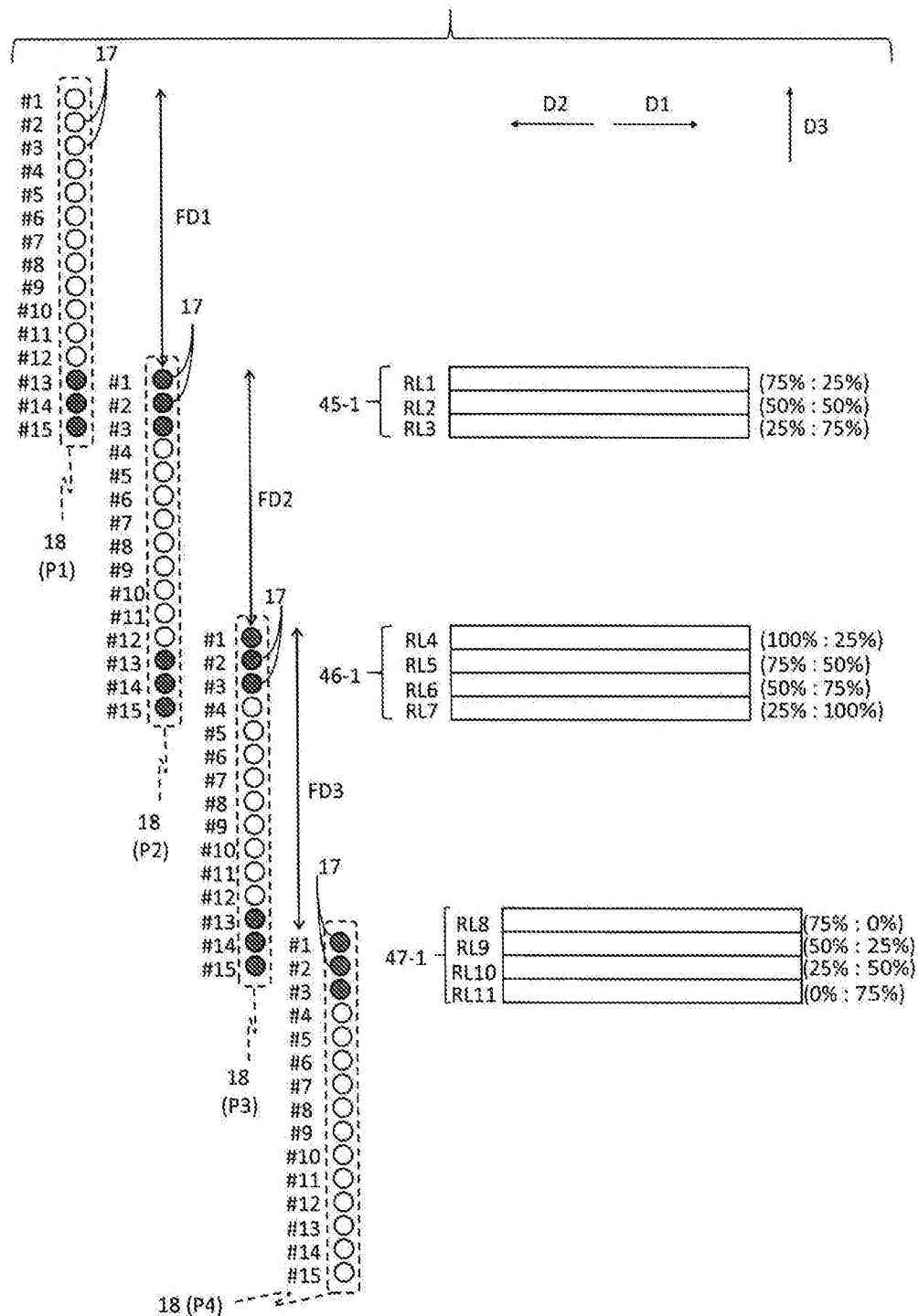
FIG. 5 is an explanatory diagram illustrating the OL processing in which a transport amount is different for each of patches.
Figure 7:
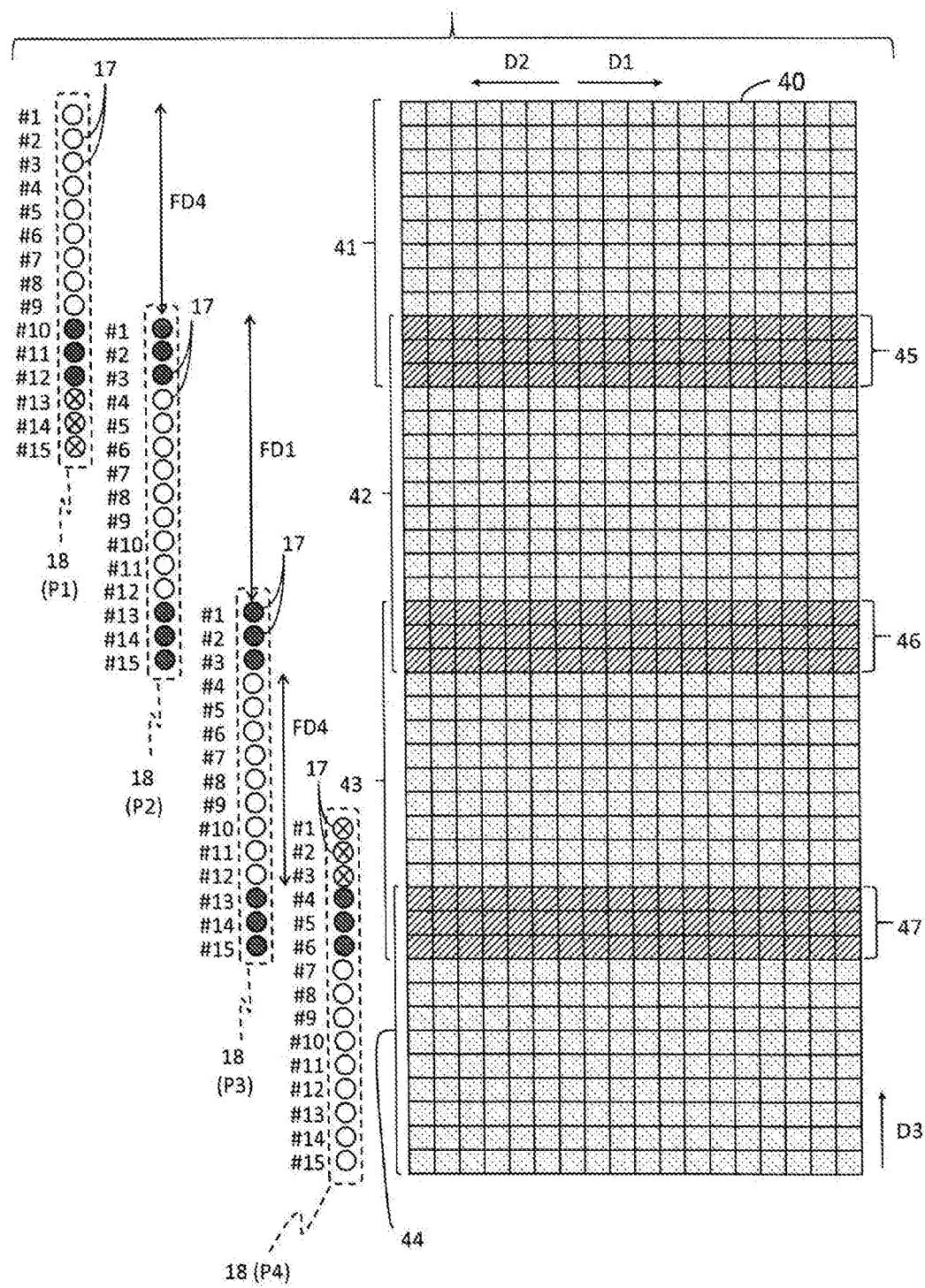
FIG. 7 is an explanatory diagram illustrating recording processing including the OL processing in which an OL nozzle range is different for each of the patches.

In FIG. 4 and in FIGS. 5 and 7 to be described below, for ease of understanding, each of the nozzles 17 corresponding to the OL nozzle in each of the main scannings is illustrated by a gray solid circle. On the other hand, each of the nozzles 17 illustrated by a white circle in FIGS. 4, 5, and 7 is the non-OL nozzle in the main scanning at that time.

Of the recording data 40, each pixel row configuring the non-OL region is recorded by one of the non-OL nozzles in a single main scanning. The pixel row is a region in which the pixels are continuously aligned in parallel to the directions D1 and D2, and is also referred to as a raster line. Of the recording data 40, each of the raster lines configuring the patch is recorded by two of the nozzles 17 in total, with the one raster line separately recorded by the two main scannings. For example, each of the pixels of the raster line located most downstream in the transport direction D3 in the first patch 45 is allocated to and recorded by the nozzle 17 having the nozzle number #13 in the main scanning P1, and the nozzle 17 having the nozzle number #1 in the main scanning P2. Although it is of course conceivable to perform the OL processing in which the one raster line is recorded by separately performing the main scanning three or more times, the present exemplary embodiment will be continued to be described below assuming that the one raster line is recorded by separately performing the main scanning twice.

At step S120, based on the transport distance FD1, the number of nozzles 17 configuring the nozzle row 18, and positions and the number of OL nozzles in the standard OL processing, the control unit 11 identifies the OL regions, namely, the patches in the recording data 40. The control unit 11 associates each of the identified patches with the different recording conditions of the OL processing in a one-to-one manner. Specific examples of the recording conditions will be described in each of the following examples.

At step S130, the control unit 11 sequentially outputs, to the recording head 15, the dot data converted from the recording data at step S110, while grouping the dot data in units corresponding to each of the main scannings. Further, along with the dot data, the control unit 11 outputs various types of commands required to control the main scanning and the sub scanning, to the recording head 15, the transport unit 16, and the carriage motor that moves the carriage 20. The commands include, for example, a command issuing an instruction to the transport unit 16 regarding the transport distance of the recording medium 30 by a single sub scanning, a command to control the movement of the carriage 20, a command issuing an instruction to the transport unit 16 regarding the recording medium 30 to be used, and the like. These commands are also commands to realize the OL processing having the different recording conditions for each of the patches in a specific manner.

In the output processing of the dot data, of the dot data, the control unit 11 outputs all the pixels in the non-OL region in the same band while assigning them to the same main scanning. For example, the pixels in the non-OL region in the first band 41 are output with all the pixels being assigned to the main scanning P1. On the other hand, of the dot data, the control unit 11 allocates the pixels of the patch to the two main scannings that record the patch. For example, the dot data of the first patch 45 is output with some of the pixels of each of the raster lines allocated to each of the OL nozzles of the main scanning P1, and the remaining pixels of each of the raster lines are output while being allocated to each of the OL nozzles of the main scanning P2. The allocation of the pixels of the patch to each of the main scannings is performed using a dot allocation mask 50, which will be described below.

As a result of the output processing of the dot data and the commands at step S130, the main scanning and the sub scanning are repeatedly performed, and the test image represented by the recording data acquired at step S100 is recorded on the recording medium 30 prescribed by the command, based on the dot data. In this case, of course, of the dot data, each of the patches is recorded by the OL processing. Such test recording is a process of recording the patches on the recording medium 30 by performing the OL processing, and includes a patch recording step in which the patches are recorded at a plurality of positions that are different in the sub scanning direction, by the plurality of types of the OL processing having the respectively different recording conditions.

The transport unit 16 transports the recording medium 30 that is prescribed by the command from upstream of a transport path. It is assumed that a type of the recording medium 30 for the actual recording has been specified by the operation of the operation accepting unit 14 by the user prior to step S100. Then, at step S130, the control unit 11 outputs, as a type of the command, a command prescribing the specified type of the recording medium 30. As a result, the recording medium 30 of the same type as the recording medium 30 specified by the user to be used for the actual recording is used for the test recording.

3. First Example

The recording conditions of the OL processing can be caused to be different for each of the patches by varying the transport distance of the recording medium 30 by the sub scanning between the two main scannings for recording the patch.

FIG. 5 is an explanatory diagram illustrating the OL processing according to a first example in which the transport distance is caused to be different for each of the patches.

Figure 6:
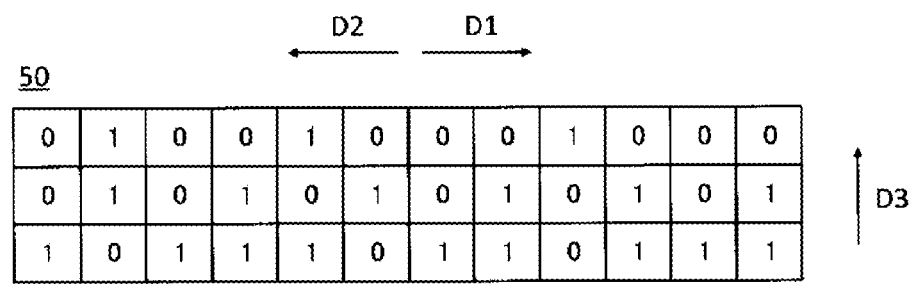
FIG. 6 is a diagram illustrating an example of a dot allocation mask.

FIG. 6 illustrates the dot allocation mask 50. First, the dot allocation mask 50 will be briefly described. The dot allocation mask 50 is a mask in which pixels each storing a value of "0" or "1" are arranged vertically and horizontally. In the output processing of the dot data at step S130, the control unit 11 superimposes the dot allocation mask 50 on the patches in the dot data. When the dot allocation mask 50 is superimposed on the patches in the dot data, the pixels of the dot allocation mask 50 and the pixels of the patches overlap with each other while each having a one-to-one relationship. Of the pixels in the patches, the control unit 11 allocates the pixels located at positions overlapping with "0" in the dot allocation mask 50 to a preceding main scanning, and allocates the pixels located at positions overlapping with "1" in the dot allocation mask 50 to a subsequent main scanning.

The preceding main scanning is the main scanning that is performed first among the two main scannings for recording the patch, and the subsequent main scanning is the main scanning that is performed subsequently among the two main scannings for recording the patch. Focusing on the first patch 45, of the main scanning P1 and the main scanning P2 for recording the first patch 45, the main scanning P1 corresponds to the preceding main scanning, and the main scanning P2 corresponds to the subsequent main scanning. Similarly, focusing on the second patch 46, the main scanning P2 corresponds to the preceding main scanning, and the main scanning P3 corresponds to the subsequent main scanning. Focusing on the third patch 47, the main scanning P3 corresponds to the preceding main scanning, and the main scanning P4 corresponds to the subsequent main scanning.

A ratio of "0" in the pixel row is higher the further downstream the pixel row is located in the transport direction D3, and conversely a ratio of "1" in the pixel row is higher the further upstream the pixel row is located in the transfer direction D3. According to the characteristics of the dot allocation mask 50, of the pixels in the patches, the pixels located closer to the non-OL region of the band recorded by the preceding main scanning are more likely to be allocated to the preceding main scanning, and the pixels located closer to the non-OL region of the band recorded by the subsequent main scanning are more likely to be allocated to the subsequent main scanning.

The sum of the ratios of "0" and "1" in the pixel row of the dot allocation mask 50 is 100% for each of the pixel rows. As the first patch 45, the second patch 46, and the third patch 47 illustrated in FIG. 4 are respectively formed by the three raster lines, the dot allocation mask 50 is configured by three of the pixel rows in FIG. 6. In the dot allocation mask 50, the ratio between "0" and "1" in the pixel row located downstream in the transport direction D3 is 75% to 25%, and more "0"s than "1"s are arranged in the pixel row. Further, of the three pixel rows of the dot allocation mask 50, the ratio between "0" and "1" in the center pixel row is 50% to 50%, and the ratio between "0" and "1" in the pixel row located upstream in the transport direction D3 is 25% to 75%.

Similarly to FIG. 4, FIG. 5 illustrates a state in which the plurality of main scannings P1, P2, P3, and P4 are performed, by illustrating the nozzle row 18 at a plurality of locations while shifting the nozzle row 18 along the transport direction D3. In FIG. 5, the transport distance of the recording medium 30 by the sub scanning between the main scanning P1 and the main scanning P2 is the transport distance FD1, as in FIG. 4. However, in FIG. 5, the transport distance of the recording medium 30 between the main scanning P2 and the main scanning P3 is a transport distance FD2, and the transport distance of the recording medium 30 between the main scanning P3 and the main scanning P4 is a transport distance FD3.

According to the standard OL processing illustrated in FIG. 4, by transporting the recording medium 30 only by the transport distance FD1 in each of the sub scannings, a region recorded by the OL nozzles that are each of the nozzles 17 having the nozzle numbers #13 to #15 in the preceding main scanning can be transported to a position at which the region is recorded by the OL nozzles that are each of the nozzles 17 having the nozzle numbers #1 to #3 in the subsequent main scanning.

The transport distance FD2 is shorter than the transport distance FD1. In an example illustrated in FIG. 5, the transport distance FD2 is a distance that is 11 times the nozzle pitch. The transport distance FD3 is longer than the transport distance FD1. In the example illustrated in FIG. 5, the transport distance FD3 is a distance that is 13 times the nozzle pitch. In the first example, at step S120, the control unit 11 associates those different transport distances with each of the patches. As an example, the control unit 11 associates the transport distance FD1 with the first patch 45, associates the transport distance FD2 with the second patch 46, and associates the transport distance FD3 with the third patch 47. Then, at step S130, the control unit 11 outputs, as a type of the various commands described above, a command issuing the transport unit 16 with an instruction regarding the different transport distances associated with each of the patches. As a result, the transport unit 16 that has received the command from the control unit 11 performs the transport of the recording medium 30 in accordance with the transport distance associated with the patch, as the sub scanning performed between the preceding main scanning and the next subsequent main scanning for recording the band including the patch.

In FIG. 5, patches 45-1, 46-1, and 47-1 recorded on the recording medium 30 are additionally illustrated in correspondence with positions in which the nozzle rows 18 illustrated for each the main scannings P1, P2, P3, and P4 overlap with each other. The first patch 45-1 is a result of recording the first patch 45, which is the data of a partial region in the recording data 40, on the recording medium 30, by the OL processing as a result of step S130. The second patch 46-1 is a result of recording the second patch 46 in the recording data 40 on the recording medium 30, by the OL processing, and the third patch 47-1 is a result of recording the third patch 47 in the recording data 40 on the recording medium 30, by the OL processing. In FIG. 5, recording results of the non-OL regions in the recording data 40 are omitted, except for a portion included in the second patch 46-1.

The first patch 45-1 is configured by three raster lines RL1, RL2, and RL3 aligned in the transport direction D3. The raster lines RL1, RL2, RL3, and the like are results of recording each of the raster lines configuring the patches in the recording data 40 on the recording medium 30. However, with respect to FIG. 5, such a recording result is also referred to as the raster line. As can be understood from the description above, the first patch 45-1 is an image reproduced on the recording medium 30 by ejection of the ink by each of the nozzles 17 having the nozzle numbers #13 to #15 in the main scanning P1, transport of the recording medium 30 by the transport distance FD1, which is the standard transport distance, and ejection of the ink by each of the nozzles 17 having the nozzle numbers #1 to #3 in the main scanning P2. Further, the first patch 45 in the recording data 40 is allocated to the main scanning P1 and the main scanning P2 by the dot allocation mask 50.

Accordingly, the raster line RL1 configuring the first patch 45-1 is an image recorded as a result of 75% of the pixels configuring the raster line RL1 in the form of the dot data being allocated to the nozzle 17 having the nozzle number #13 in the main scanning P1, and the remaining 25% of the pixels being allocated to the nozzle 17 having the nozzle number #1 in the main scanning P2. Further, the raster line RL2 is an image recorded as a result of 50% of the pixels configuring the raster line RL2 in the form of the dot data being allocated to the nozzle 17 having the nozzle number #14 in the main scanning P1, and the remaining 50% of the pixels being allocated to the nozzle 17 having the nozzle number #2 in the main scanning P2. Furthermore, the raster line RL3 is an image recorded as a result of 25% of the pixels configuring the raster line RL3 in the form of the dot data being allocated to the nozzle 17 having the nozzle number #15 in the main scanning P1, and the remaining 25% of the pixels being allocated to the nozzle 17 having the nozzle number #3 in the main scanning P2. In FIG. 5, the ratio of the pixels allocated to the preceding main scanning and the ratio of the pixels allocated to the subsequent main scanning are indicated next to each of the raster lines in parentheses.

In the meantime, the second patch 46-1 is configured by four raster lines RL4, RL5, RL6, and RL7 aligned in the transport direction D3. The second patch 46-1 is an image reproduced on the recording medium 30 by ejection of the ink by each of the nozzles 17 having the nozzle numbers #12 to #15 in the main scanning P2, transport of the recording medium 30 by the transport distance FD2, and ejection of the ink by each of the nozzles 17 having the nozzle numbers #1 to #4 in the main scanning P3. The second patch 46 in the recording data 40 is allocated to the main scanning P2 and the main scanning P3 by the dot allocation mask 50.

The transport distance FD2 is shorter than the transport distance FD1 by one nozzle pitch. Thus, a position on the recording medium 30 recorded by the nozzle 17 having the nozzle number #12, which is the non-OL nozzle, in the main scanning P2, is recorded again in an overlapping manner by the nozzle 17 having the nozzle number #1, which is the OL nozzle, in the main scanning P3. All of the pixels configuring one of the raster lines included in the non-OL region in the recording data 40 are allocated to the nozzle 17 having the nozzle number #12, which is the no-OL nozzle. On the other hand, 25% of the pixels configuring the one of the raster lines included in the patch in the recording data 40 are allocated by the dot allocation mask 50 to the nozzle 17 having the nozzle number #1, which is the OL nozzle. Accordingly, the sum of the pixel allocation ratios for the nozzle 17 having the nozzle number #12 in the main scanning P2 and the nozzle 17 having the nozzle number #1 in the main scanning P3, which together record the raster line RL4, becomes 125% (100%+25%=125%).

75% of the pixels configuring one of the raster lines included in the patch in the recording data 40 are allocated by the dot allocation mask 50 to the nozzle 17 having the nozzle number #13, which is the OL nozzle. Then, 50% of the pixels configuring the one of the raster lines included in the patch in the recording data 40 are allocated by the dot allocation mask 50 to the nozzle 17 having the nozzle number #2 in the main scanning P3, which is the OL nozzle. Accordingly, the sum of the pixel allocation ratios for the nozzle 17 having the nozzle number #13 in the main scanning P2 and the nozzle 17 having the nozzle number #2 in the main scanning P3, which together record the raster line RL5, becomes 125% (75%+50%=125%).

Similarly, the sum of the pixel allocation ratios for the nozzle 17 having the nozzle number #14 in the main scanning P2 and the nozzle 17 having the nozzle number #3 in the main scanning P3, which together record the raster line RL6, becomes 125% (50%+75%=125%).

Further, the nozzle 17 having the nozzle number #4 is the non-OL nozzle. Accordingly, the sum of the pixel allocation ratios for the nozzle 17 having the nozzle number #15 in the main scanning P2 and the nozzle 17 having the nozzle number #4 in the main scanning P3, which together record the raster line RL7, becomes 125% (25%+100%=125%).

In this manner, compared to the first patch 45 that is associated with the transport distance FD1 at step S120, in the second patch 46 that is associated, at step S120, with the transport distance FD2, which is shorter than the transport distance FD1, each of the raster lines is more likely to be recorded by a larger number of the dots, and the second patch 46-1 is more likely to be thicker than the first patch 45-1 as a recording result.

The third patch 47-1 is configured by four raster lines RL8, RL9, RL10 and RL11 aligned in the transport direction D3. The third patch 47-1 is an image reproduced on the recording medium 30 by ejection of the ink by each of the nozzles 17 having the nozzle numbers #13 to #15 in the main scanning P3, transport of the recording medium 30 by the transport distance FD3, and ejection of the ink by each of the nozzles 17 having the nozzle numbers #1 to #3 in the main scanning P4. The third patch 47 in the recording data 40 is allocated to the main scanning P3 and the main scanning P4 by the dot allocation mask 50.

The transport distance FD3 is longer than the transport distance FD1 by one nozzle pitch. Thus, a position on the recording medium 30 recorded by the nozzle 17 having the nozzle number #14, which is the OL nozzle, in the main scanning P3 is recorded again in an overlapping manner by the nozzle 17 having the nozzle number #1, which is the OL nozzle, in the main scanning P4. This means that a position on the recording medium 30 recorded by the nozzle 17 having the nozzle number #13, which is the OL nozzle, in the main scanning P3, is not recorded again in an overlapping manner in the main scanning P4. 75% of the pixels configuring one of the raster lines included in the patch in the recording data 40 are allocated by the dot allocation mask 50 to the nozzle 17 having the nozzle number #13, which is the OL nozzle. Accordingly, the pixel allocation ratio of 75% for the nozzle 17 having the nozzle number #13 in the main scanning P3, which solely records the raster line RL8, becomes the sum of the pixel allocation ratios for the recording of the raster line RL8.

50% of the pixels configuring one of the raster lines included in the patch in the recording data 40 are allocated by the dot allocation mask 50 to the nozzle 17 having the nozzle number #14, which is the OL nozzle. Then, 25% of the pixels configuring the one of the raster lines included in the patch in the recording data 40 are allocated by the dot allocation mask 50 to the nozzle 17 having the nozzle number #1, which is the OL nozzle. Accordingly, the sum of the pixel allocation ratios for the nozzle 17 having the nozzle number #14 in the main scanning P3 and the nozzle 17 having the nozzle number #1 in the main scanning P4, which together record the raster line RL9, becomes 75% (50%+25%=75%).

Similarly, the sum of the pixel allocation ratios for the nozzle 17 having the nozzle number #15 in the main scanning P3 and the nozzle 17 having the nozzle number #2 in the main scanning P4, which together record the raster line RL10, becomes 25% (25%+50%=75%).

Further, the pixel allocation ratio of 75% for the nozzle 17 having the nozzle number #3 in the main scanning P4, which solely records the raster line RL11, becomes the sum of the pixel allocation ratios for the recording of the raster line RL11.

In this manner, compared to the first patch 45 that is associated with the transport distance FD1 at step S120, in the third patch 47 that is associated, at step S120, with the transport distance FD3, which is longer than the transport distance FD1, each of the raster lines is more likely be recorded by a smaller number of the dots, and the third patch 47-1 is likely to be thinner than the first patch 45-1 as a recording result.

4. Second Example

The recording conditions of the OL processing can be caused to be different for each of the patches by varying an interval time, which is a time period between the main scanning and the next main scanning.

With respect to a second example and a third example to be described below, while assuming that the standard OL processing is performed, descriptions considered necessary to be added will be given.

The interval time can be defined, for example, as a time period from an end of the preceding main scanning to a start of the subsequent main scanning. The interval time is a drying time in which the dots ejected onto the recording medium 30 by the preceding main scanning are dried before the subsequent main scanning is performed. The interval time is set to be equal to or greater than a time period required for a single sub scanning to be performed by the transport unit 16. A difference in the drying time results in a difference in the image quality of the patch recorded by the OL processing.

In the second example, at step S120, the control unit 11 associates different interval times with each of the patches. The control unit 11 associates a first interval time with the first patch 45, a second interval time with the second patch 46, and a third interval time with the third patch 47. For example, the first interval time is greater than the second interval time, and the second interval time is greater than the third interval time.

Then, at step S130, the control unit 11 outputs, as a type of the commands described above, a command issuing the carriage motor and the recording head 15 with an instruction regarding the different interval times associated with each of the patches. As a result, the carriage motor and the recording head 15 that have received the command from the control unit 11 start the next main scanning by starting to move the carriage 20 and drive the recording head 15 at a timing at which the interval time associated with the patch has elapsed after the end of the preceding main scanning that has recorded the band including the patch.

5. Third Example

The recording conditions of the OL processing can be caused to be different for each of the patches by varying the movement speed of the recording head 15 in the main scanning. The movement speed of the recording head 15 is synonymous with the movement speed of the carriage 20. A difference in the movement speed of the recording head 15 results in a difference in the image quality of the patch recorded by the OL processing.

In the third example, at step S120, the control unit 11 sets the movement speed of the carriage 20 for each of the plurality of main scannings for recording the recording data 40. At this time, the control unit 11 sets a movement speed different from those of the other main scannings for at least one of the main scannings, so that the combination of the movement speed of the preceding main scanning and the movement speed of the subsequent main scanning is different for each of the patches. In other words, in the third example, at step S120, the control unit 11 causes the combination of the movement speed of the preceding main scanning and the movement speed of the subsequent main scanning to be different for each of the patches, and associates the movement speeds with the main scannings.

For example, the control unit 11 sets a first movement speed for the main scanning P1, sets the first movement speed for the main scanning P2, sets a second movement speed for the main scanning P3, and sets the second movement speed for the main scanning P4. It is assumed that the first movement speed is slower than the second movement speed. In this case, the first patch 45 in the recording data 40 is recorded by the main scanning P1 with the first movement speed and the main scanning P2 with the same first movement speed. Further, the second patch 46 is recorded by the main scanning P2 with the first movement speed and the main scanning P3 with the second movement speed, which is faster than the first movement speed. The third patch 47 is recorded by the main scanning P3 with the second movement speed and the main scanning P4 with the same second movement speed.

At step S130, the control unit 11 outputs, as a type of the commands described above, a command issuing the carriage motor and the recording head 15 with an instruction regarding the movement speeds of the carriage 20 set for each of the main scannings in the above-described manner. As a result, the carriage motor and the recording head 15 that have received the command from the control unit 11 perform each of the main scannings at the movement speed set for each of the main scannings. The recording head 15 changes a drive time of the nozzle 17 required for recording one pixel, in other words, a drive frequency of the nozzle 17 per unit time, in accordance with the movement speed of the carriage 20. As a result, regardless of the movement speed of the carriage 20, the dots can be recorded at a predetermined resolution in the main scanning direction during each of the main scanning periods.

6. Fourth Example

The recording conditions of the OL processing can be caused to be different for each of the patches by varying the OL nozzle range used for recording the patches. In the description above, the OL nozzle range in the nozzle row 18 is fixed. In contrast, in a fourth example, the OL nozzle range is variable. In addition, in the fourth example and the above-described first example, unlike in the standard OL processing, the transport distance of the recording medium 30 for each of the sub scannings is not constant.

FIG. 7 is an explanatory diagram illustrating recording processing including the OL processing of the fourth example. FIG. 7 can be viewed in the same manner as FIG. 4. With respect to FIG. 7, differences between FIG. 7 and FIG. 4 will be mainly described.

In the fourth example, at step S120, the control unit 11 determines the OL nozzle range to be used for the preceding main scanning and the OL nozzle range to be used for the subsequent main scanning, for each of the plurality of main scannings for recording the recording data 40. Here, the nozzles 17 having the nozzle numbers #1 to #3 are referred to as a first nozzle group (#1 to #3), and the nozzles 17 having the nozzle numbers #13 to #15 are referred to as a second nozzle group (#13 to #15). Further, the nozzles 17 having the nozzle numbers #4 to #6 are referred to as a third nozzle group (#4 to #6), and the nozzles 17 having the nozzle numbers #10 to #12 are referred to as a fourth nozzle group (#10 to #12).

For example, the control unit 11 determines the OL nozzle range for recording the patch using the main scanning P1 as the preceding main scanning, to be the fourth nozzle group (#10 to #12), and determines the OL nozzle range for recording the patch using the main scanning P2 as the subsequent main scanning, to be the first nozzle group (#1 to #3). Further, the control unit 11 determines the OL nozzle range for recording the patch using the main scanning unit P2 as the preceding main scanning, to be the second nozzle group (#13 to #15), and determines the OL nozzle range for recording the patch using the main scanning P3 as the subsequent main scanning, to the first nozzle group (#1 to #3). Further, the control unit 11 determines the OL nozzle range for recording the patch using the main scanning unit P3 as the preceding main scanning, to be the second nozzle group (#13 to #15), and determines the OL nozzle range for recording the patch using the main scanning P4 as the subsequent main scanning, to the third nozzle group (#4 to #6).

Such determination of the OL nozzle range for each of the main scannings may be considered as a process of causing the combination of the OL nozzle ranges for the preceding main scanning and the subsequent main scanning for recording the patch to be different for each of the patches, and associates the combinations with the main scannings. In FIG. 7, the nozzles 17 marked with x are unused nozzles, which are not used for the recording in the main scanning of that time. The control unit 11 does not output the dot data for the unused nozzles in the output processing of the dot data at step S130.

In the main scanning in which the third nozzle group (#4 to #6) is the OL nozzle range, the first nozzle group (#1 to #3) located further to the end of the nozzle row 18 than the third nozzle group becomes the unused nozzles. In addition, in the main scanning in which the fourth nozzle group (#10 to #12) is the OL nozzle range, the second nozzle group (#13 to #15) located further to the end of the nozzle row 18 than the fourth nozzle group becomes the unused nozzles.

The control unit 11 that has determined the OL nozzle range for each of the main scannings in this manner also determines the transport distance for each of the sub scannings at step S120. According to an example of FIG. 7, the control unit 11 determines a transport distance FD4 as the transport distance of the sub scanning between the main scanning P1 and the main scanning P2, in order to record the first patch 45 using the fourth nozzle group (#10 to #12) in the main scanning P1 and the first nozzle group (#1 to #3) in the main scanning P2. Similarly, the control unit 11 determines the transport distance FD1 as the transport distance of the sub scanning between the main scanning P2 and the main scanning P3, in order to record the second patch 46 using the main scanning P2 and the main scanning P3. Further, the control unit 11 determines the transport distance FD4 as the transport distance of the sub scanning between the main scanning P3 and the main scanning P4, in order to record the third patch 47 by the main scanning P3 and the main scanning P4. In the example of FIG. 7, the transport distance FD4 is a distance that is nine times the nozzle pitch. The control unit 11 identifies the OL regions, namely, the patches in the recording data 40 based on the OL nozzle range determined for each of the main scannings, the transport distance for each of the sub scannings determined in accordance with the OL nozzle range, and the like.

At step S130, the control unit 11 allocates the pixels configuring the patch in the dot data to each of the nozzles 17 in the OL nozzle range determined for each of the main scannings for recording the patch in the above-described manner, and outputs the pixels for the timing of each of the main scannings. In addition, as the command, the control unit 11 issues the transport unit 16 with an instruction regarding the transport distance for each of the sub scannings determined in accordance with the OL nozzle range for each of the main scannings in the above-described manner. As a result, the test recording including the OL processing as illustrated in FIG. 7 is performed on the recording medium 30. Characteristics of the ink ejection by each of the nozzles 17 are not uniform. Thus, by varying the OL nozzle range for recording the patch, for each of the patches, differences in the image quality arise between each of the patches recorded on the recording medium 30.

7. Fifth Example

As a matter of course, combinations of the first to fourth examples are included in the present embodiment.

In other words, the control unit 11 may perform single test recording in which the plurality of patches are recorded, while causing two or more factors among specific factors of the recording conditions of the OL processing, namely, the transport distance of the sub scanning, the interval time, the movement speed of the recording head 15, and the OL nozzle range, to be different for each of the patches.

8. Selection of Patch and Determination of Recording Conditions

The flowchart illustrated in FIG. 3 will be further described below.

The control unit 11 accepts a patch selection from among the plurality of recorded patches (step S140). Step S140 corresponds to a selection accepting step.

Figure 8:
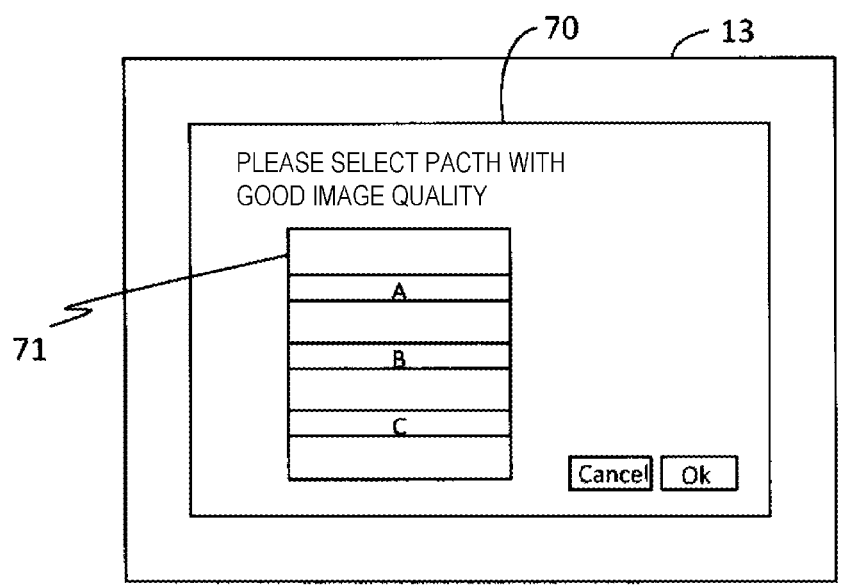
FIG. 8 illustrates an example of a UI screen.

FIG. 8 illustrates an example of a user interface (UI) screen 70 for accepting the patch selection. After the test recording, the control unit 11 causes the display unit 13 to display the UI screen 70. The UI screen 70 displays a message explaining that the patch with a good image quality should be selected, and a test image 71. The test image 71 is an image represented by the recording data acquired at step S100, and is a result of the recording data 40 being drawn on the display unit 13 in accordance with the examples illustrated in FIG. 4 and FIG. 7. Further, in the test image 71 of the UI screen 70, the control unit 11 may display a plurality of frames indicating regions corresponding to each of the patches, or may display symbols or character strings for identifying each of the patches, in order to make it easier for the user to recognize each of the patches.

In an example of FIG. 8, three frames indicating three of the patches, and symbols A, B, and C indicating the three patches are displayed in the test image 71. According to the examples described above, a patch A corresponds to the first patch 45. Similarly, a patch B corresponds to the second patch 46, and a patch C corresponds to the third patch 47. Of course, the number of patches recorded at different positions along the transport direction D3 may be more than three in the single test recording.

The user visually recognizes the recording result of the test image on the recording medium 30 that is output by the recording device 10, selects the patch with the best image quality, and performs an operation for selecting the patch with the best image quality on the UI screen 70 via the operation accepting unit 14. As the operation for selecting the patch with the best image quality in the recording result, the user may, for example, click or touch the display of one of the patches in the test image 71 corresponding to the selected patch. The patch with the good image quality is a patch having small differences in the image quality, such as differences in the density between the patch and a non-patch region, namely, the non-OL region, or a misalignment of patterns. Note that, as long as the UI screen 70 is an UI screen for accepting the operation of the user for selecting a desired patch from the result of the test recording, the design of the UI screen 70 is not limited to an aspect illustrated in FIG. 8.

At step S150, the control unit 11 determines the recording conditions of the OL processing corresponding to the selected patch accepted at step S140, to be the recording conditions of the OL processing in the actual recording. Step S150 corresponds to a determination step. For example, at step S140, it is assumed that the control unit 11 has accepted a selection of the patch B in the test image 71 on the UI screen 70. In this case, the control unit 11 determines the recording conditions of the OL processing associated at step S120 with the patch B, that is, the second patch 46, to be the recording conditions of the OL processing to be used in the actual recording, and stores the determined recording conditions. In other words, the transport distance, the interval time, the movement speed of the recording head 15, and the OL nozzle range associated with the second patch 46 at step S120 are stored as the recording conditions of the OL processing.

Note that, among the various factors of the recording conditions of the OL processing, with respect to each of the factors that are not caused to be different for each of the patches in the test recording, a predetermined default setting is automatically used for both the test recording and the actual recording. The default setting of the transport distance is the transport distance FD1, and the default setting of the OL nozzle range is the first nozzle group and the second nozzle group. Further, the default setting of the interval time is the second interval time, and the default setting of the movement speed of the recording head 15 is the first movement speed, for example. When the recording conditions of the OL processing determined based on the previous test recording are already stored, the control unit 11 may overwrite the stored recording conditions with the recording conditions of the OL processing determined based on the test recording performed most recently. In this way, the flowchart illustrated in FIG. 3 ends.

When performing the recording that is not the test recording, in other words, the actual recording in response to an instruction from the user, the control unit 11 performs the recording of the recording image based on the recording data for the actual recording, using the recording conditions of the OL processing stored at that time. As a result, the user can obtain a good recording result having no or substantially no image quality difference between the non-OL regions and the OL regions.

Note that the present exemplary embodiment may have a configuration in which the recording head 15 performs bidirectional recording combining the main scanning in the forward direction and the main scanning in the return direction, or may be configured to perform unidirectional recording by the main scanning in only one of the directions.

9. Conclusion

In this manner, according to the present exemplary embodiment, the recording condition determining method is a method executed by the recording device 10 performing the recording onto the recording medium 30 by a main scanning in which, while moving the recording head 15 that is provided with a plurality of nozzles 17 in the main scanning direction, dots of a liquid are ejected from the plurality of nozzles 17 onto the recording medium 30, and the sub scanning in which the recording medium 30 is transported in the sub scanning direction intersecting the main scanning direction. The method includes the patch recording step of recording patches onto the recording medium by overlap-processing in which the main scanning is performed on a partial region of the recording medium a plurality of times in an overlapping manner, the patch recording step being performed by recording the patches at a plurality of different positions in the sub scanning direction by a plurality of types of the overlap-processing under respectively different recording conditions, in a single recording job performed by the recording device. The method further includes a selection accepting step of accepting selection of a patch from among the plurality of recorded patches, and a determination step of determining, as a recording condition of the overlap-processing of the actual recording, the recording condition of the overlap-processing corresponding to the patch selected in the selection accepting step.

According to the above-described configuration, as a result of the patch recording step, the plurality of patches are recorded on the recording medium 30 while being aligned in the sub scanning direction, by the plurality of types of the OL processing having the respectively different recording conditions. Accordingly, the user can easily compare the plurality of recorded patches to select the patch with a good image quality, and can cause the recording device 10 to determine the recording conditions of the appropriate OL processing to be employed in the actual recording. Further, an amount of the recording medium 30 consumed in order to test the plurality of types of the OL processing having the respectively different recording conditions can be reduced. Furthermore, since the plurality of types of the OL processing having the respectively different recording conditions can be tested in the single recording job, the user does not need to cause the recording device 10 to repeatedly perform jobs as the test recording until the appropriate OL processing to be employed in the actual recording is determined.

In addition, according to the first example, in the patch recording step, the recording conditions of the OL processing for the respective patches are caused to be different by varying the transport distance of the recording medium 30 by the sub scanning between the preceding main scanning and the subsequent main scanning.

According to the above-described configuration, by varying the transport distance of the recording medium 30 between the preceding main scanning and the subsequent main scanning for recording the patch, for each of the patches, the plurality of patches having the respectively different recording conditions of the OL processing can be recorded while being aligned in the sub scanning direction.

In addition, according to the second example, in the patch recording step, the recording conditions of the OL processing for each of the patches are caused to be different by varying the interval time, which is the time period between the preceding main scanning and the subsequent main scanning.

According to the above-described configuration, by varying the interval time between the preceding main scanning and the subsequent main scanning, for each of the patches, the plurality of patches having the respectively different recording conditions of the OL processing can be recorded while being aligned in the sub scanning direction.

In addition, according to the third example, in the patch recording step, the recording conditions of the OL processing for each of the patches are caused to be different by varying the speed movement of the recording head 15 by the main scanning.

According to the above-described configuration, by varying the combination of the movement speeds of the recording head 15 in the preceding main scanning and the subsequent main scanning for each of the patches, the plurality of patches having the respectively different recording conditions of the OL processing can be recorded while being aligned in the sub scanning direction.

In addition, according to the fourth example, in the patch recording step, the recording conditions of the OL processing for each of the patches are caused to be different by varying the OL nozzle range, which is a range, in the scan scanning direction, of the nozzles used for recording the patch.

According to the above-described configuration, by varying the combination of the OL nozzle ranges in the preceding main scanning and the subsequent main scanning for each of the patches, the plurality of patches having the respectively different recording conditions of the OL processing can be recorded while being aligned in the sub scanning direction.

The content of the recording image recorded by the actual recording is various, including photographic images, line drawings, painted pictures, and the like, and colors used may be relatively light or relatively dark. Then, due to such differences in the content of the recording image, the way to appropriately perform the OL processing also differs. From such a perspective, in one mode of the present exemplary embodiment, in the patch recording step, the patch is recorded based on the recording data specified for the actual recording.

According to the above-described configuration, in the patch recording step, since the patch is recorded based on the same recording data as the recording data used in the actual recording, the recording conditions of the appropriate OL processing to be employed in the actual recording can be determined in accordance with the patch selection by the user.

Fixation and penetration conditions of the ejected dots are different depending on a type and surface conditions of the recording medium 30. Due to the differences in the type and surface conditions of the recording medium 30, the way to appropriately perform the OL processing also differs. Here, the "surface conditions" refer to differences in or the presence/absence of a surface treatment, such the application of glue, performed in advance on the recording medium 30. From such a perspective, in one mode of the present exemplary embodiment, in the patch recording step, the patch is recorded on the recording medium 30 specified for the actual recording.

According to the above-described configuration, in the patch recording step, since the patch is recorded on the same recording medium 30 as the recording medium 30 used in the actual recording, the recording conditions of the appropriate OL processing to be employed in the actual recording can be determined in accordance with the patch selection by the user.

However, in the present exemplary embodiment, for reasons such as the recording medium 30 used in the actual recording being expensive, another of the recording medium 30 that is similar to the recording medium 30 used in the actual recording, in terms of the type and conditions, can be used for the test recording.

The control unit 11 may record a larger number of the patches on the recording medium 30 in the test recording in a single recording job, by dividing each of the patches into a plurality of smaller regions along the main scanning direction. For example, as illustrated above, if the three patches to be recorded while being separated in the sub scanning direction are divided into three smaller regions along the main scanning direction, nine of the patches can be recorded. In this case, the control unit 11 also causes the recording conditions of the OL processing to be different for each of the patches having the different positions in the main scanning direction. For example, the control unit 11 may allocate the pixels to the preceding main scanning and the subsequent main scanning, by applying the dot allocation mask 50 in which arrangements and ratios of "0" and "1" are different for each of the patches having the different positions in the main scanning direction. Alternatively, for each of the patches having the different positions in the main scanning direction, the control unit 11 may vary the dot size used for each of the recordings, or may vary the drive voltage applied to the drive element of each of the nozzles 17 for ejecting the dots.

In other words, in the patch recording step, the patches may be recorded at the plurality of positions different from one another in the sub scanning direction and at the plurality of positions different from one another in the main scanning direction, using the plurality of types of the OL processing having the respectively different recording conditions. By arranging the plurality of patches recorded by the OL processing having the respectively different recording conditions in a two-dimensional manner in a single recording job, the consumption of the recording medium 30 can be reduced while enabling the user to select the patch with the good image quality from among the larger number of the patches.

The present exemplary embodiment does not only provide the recording condition determining method, but also provides a device that executes this method, a program (the firmware 12) that realizes this method in conjunction with hardware, and a memory that stores the program.

The recording device 10 performs the recording onto the recording medium 30 by a main scanning in which while moving a recording head 15 that is provided with the plurality of nozzles 17 in the main scanning direction, dots of the liquid are ejected from the plurality of nozzles 17 onto the recording medium 30, and the sub scanning in which the recording medium 30 is transported in the sub scanning direction intersecting the main scanning direction. The recording device 10 includes the control unit 11 that controls the main scanning and the sub scanning. When recording patches on the recording medium by the overlap-processing in which the main scanning is performed on a partial region of the recording medium 30 a plurality of times in an overlapping manner, the control unit 11 records the patches at the plurality of different positions in the sub scanning direction by the plurality of types of the overlap-processing under the respectively different recording conditions, in the single recording job performed by the recording device 10. Further, the control unit 11 accepts selection of a patch from among the plurality of recorded patches, and determines, as a recording condition of the overlap-processing for the actual recording, the recording condition of the overlap-processing corresponding to the selected patch being accepted.

What is claimed is:

1. A recording condition determining method executed by a recording device performing recording onto a recording medium by a main scanning in which, while moving a recording head that is provided with a plurality of nozzles in a main scanning direction, dots of a liquid are ejected from the plurality of nozzles onto the recording medium and a sub scanning in which the recording medium is transported in a sub scanning direction intersecting the main scanning direction, the method comprising:
a patch recording step of recording patches in a test image onto the recording medium by overlap-processing in which the main scanning is performed on a partial region of the recording medium a plurality of times in an overlapping manner, the patch recording step being performed by recording the patches at a plurality of different positions in the sub scanning direction by a plurality of types of the overlap-processing under respectively different recording conditions, in a single recording job performed by the recording device;
a non-overlap recording step of recording, on the recording medium, image other than the patches in the test image, the non-overlap recording step including performing one main scanning on a region that is different from the partial region of the recording medium in the sub-scanning direction, to record the image other than the patches in the test image;
a selection accepting step of accepting selection of a patch from among a plurality of the recorded patches; and
a determination step of determining, as a recording condition of the overlap-processing of an actual recording, the recording condition of the overlap-processing corresponding to the patch selected in the selection accepting step.

2. The record condition determining method according to claim 1, wherein
in the patch recording step, the recording conditions of the overlap-processing for the respective patches are caused to be different by varying a transport distance of the recording medium by the sub scanning between a preceding main scanning, which is the main scanning that precedes, and a subsequent main scanning, which is the main scanning subsequent to the preceding main scanning.

3. The recording condition determining method according to claim 1, wherein
in the patch recording step, the recording conditions of the overlap-processing for the respective patches are caused to be different by varying an interval time between a preceding main scanning, which is the main scanning that precedes, and a subsequent main scanning, which is the main scanning subsequent to the preceding main scanning.

4. The recording condition determining method according to claim 1, wherein
in the patch recording step, the recording conditions of the overlap-processing for the respective patches are caused to be different by varying a speed of movement of the recording head by the main scanning.

5. The recording condition determining method according to claim 1, wherein
in the patch recording step, the recording conditions of the overlap-processing for the respective patches are caused to be different by varying an overlap nozzle range, which is a range, in the sub scanning direction, of the nozzles used for recording the patches.

6. The recording condition determining method according to claim 1, wherein
in the patch recording step, the patch is recorded based on recording data specified for the actual recording.

7. The recording condition determining method according to claim 1, wherein
the patch is recorded on the recording medium specified for the actual recording.

8. A recording device performing recording onto a recording medium by a main scanning in which, while moving a recording head that is provided with a plurality of nozzles in a main scanning direction, dots of a liquid are ejected from the plurality of nozzles onto the recording medium, and a sub scanning in which the recording medium is transported in a sub scanning direction intersecting the main scanning direction, the recording device comprising a control unit configured to control the main scanning and the sub scanning, wherein
when recording patches in a test image onto the recording medium by overlap-processing in which the main scanning is performed on a partial region of the recording medium a plurality of times in an overlapping manner, the control unit records the patches at a plurality of different positions in the sub scanning direction by a plurality of types of the overlap-processing under respectively different recording conditions, in a single recording job performed by the recording device,
the control unit records, onto the recording medium, image other than the patches in the test image by a non-overlap recording processing in which one main scanning is performed on a region that is different from the partial region of the recording medium in the sub-scanning direction, the control unit accepts selection of a patch from among a plurality of the recorded patches, and the control unit determines, as the recording condition of the overlap-processing for an actual recording, the recording condition of the overlap condition corresponding to the selected patch being accepted.

\* \* \* \* \*